Sept. 29, 1942.　　　N. R. ERICKSON　　　2,296,912
APPARATUS FOR FORMING CLOVERLEAF ROLLS
Filed April 17, 1941　　　2 Sheets-Sheet 1
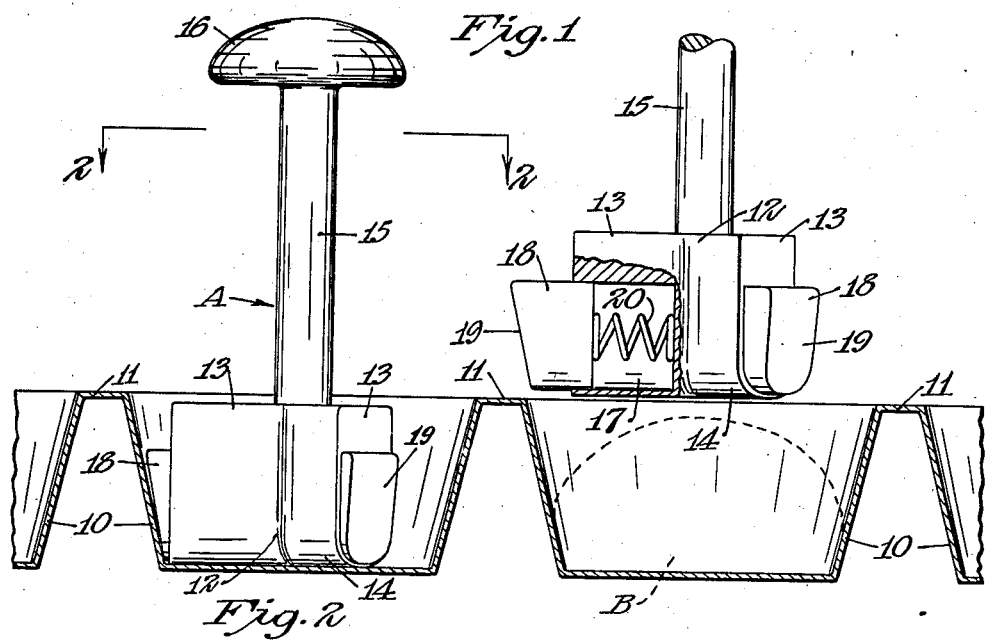
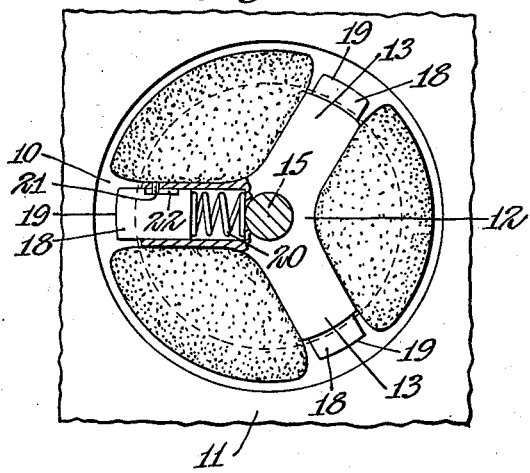
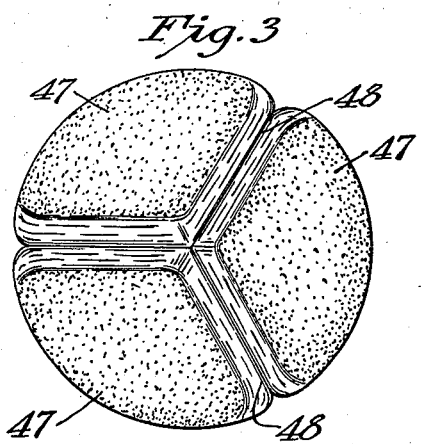
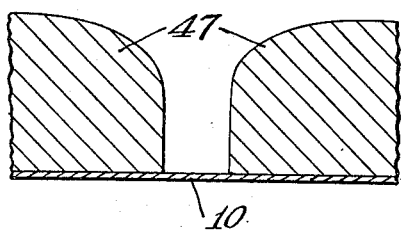
Inventor
Norman R. Erickson
By Williamson & Williamson
Attorneys Sept. 29, 1942.　　　　N. R. ERICKSON　　　　2,296,912
APPARATUS FOR FORMING CLOVERLEAF ROLLS
Filed April 17, 1941　　　2 Sheets-Sheet 2
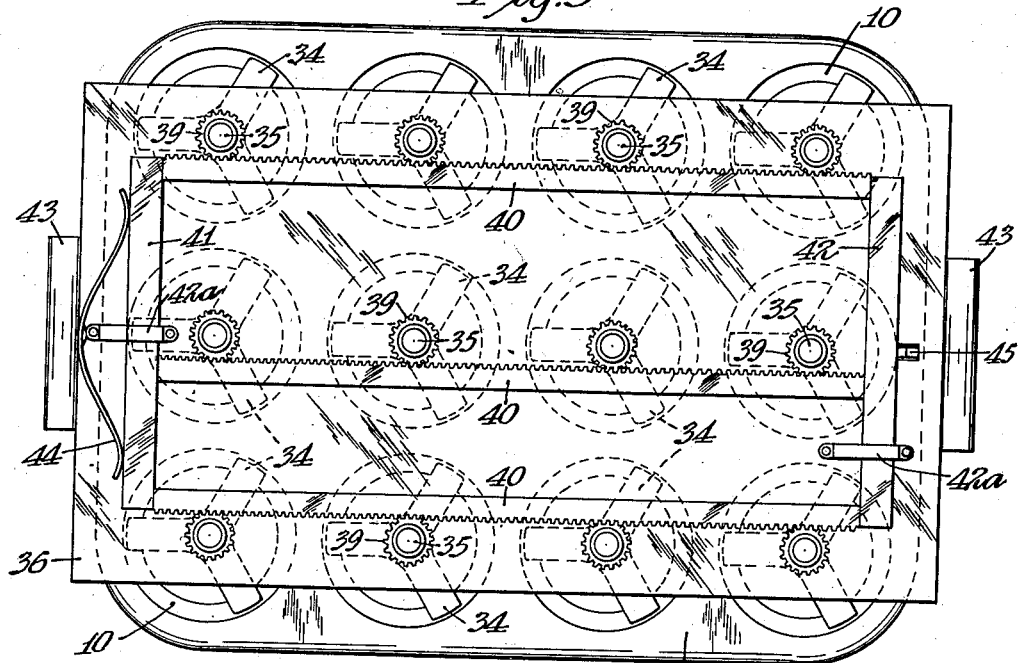
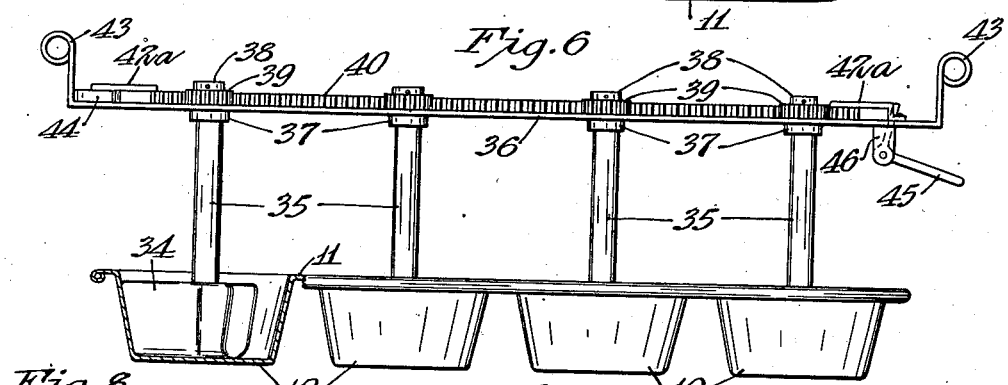
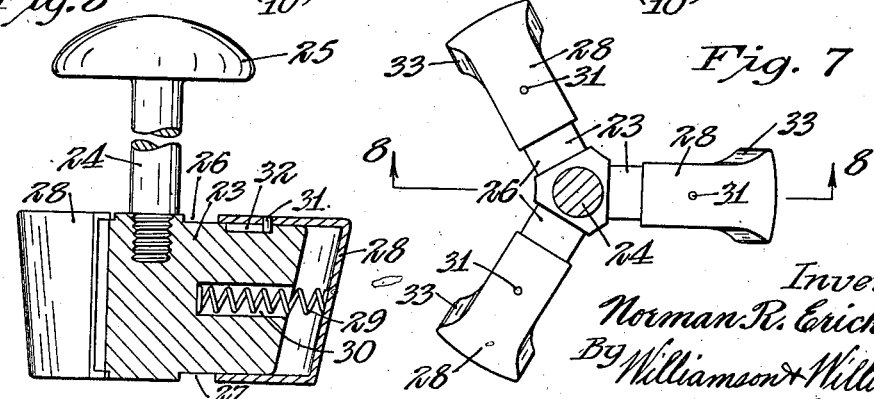
Inventor
Norman R. Erickson
By Williamson & Williamson
Attorneys Patented Sept. 29, 1942

2,296,912

UNITED STATES PATENT OFFICE 2,296,912

APPARATUS FOR FORMING "CLOVERLEAF" ROLLS

Norman R. Erickson, Mankato, Minn.

Application April 17, 1941, Serial No. 388,928

8 Claims. (Cl. 107—8)

This invention relates to dough forming apparatus and more particularly to apparatus for forming baked products which are provided with lines of separation along which the products are broken when consumed.

In describing the invention I will refer to the formation of dough in the preparation of so-called "cloverleaf" rolls which are usually made up of three separable parts, the lines of separation being formed before the dough is baked so that the several units are still together until they are pulled apart when eaten. These rolls are generally formed by first making three small balls of dough and placing them in a pan and pressing them together to some extent so that the several sections are roughly segmental. This procedure consumes considerable time and as a natural result increases the cost of production.

It is a general object of my invention to provide means for forming "cloverleaf" rolls and the like from a single ball of dough with apparatus which separates the ball into the desired number of segments with a simple and quick operation.

It is another object of the invention to provide dough forming means which can be used in conjunction with a substantially frusto-conical pan wherein means is provided for allowing for the diminishing size of the pan when the former is pressed into the pan and the dough which the pan contains.

It is another object of the invention to provide dough forming apparatus of the type described wherein a plurality of pans are filled with dough and the dough in all of the pans is formed simultaneously.

It is a further object of the invention to provide dough forming apparatus which separates the dough and which can be manipulated to properly shape the separated segments in the pan.

These and other objects and advantages of the invention will more fully appear from the following description made in connection with the accompanying drawings, wherein like reference characters refer to the same parts throughout the views, and, in which:

Fig. 1 is a fragmentary sectional view of interconnected pans with a dough former shown in one pan in elevation and a fragmentary portion of a former suspended over a pan, the latter pan having a ball of dough indicated therein in dotted lines;

Fig. 2 is a sectional view taken approximately on the line 2—2 of Fig. 1, but with segments of dough shown in the pan and with one of the former arms broken away to show interior structure;

Fig. 3 is an illustration of a roll formed with my apparatus;

Fig. 4 is a fragmentary section of adjacent dough segments immediately after formation;

Fig. 5 is a plan view of a form of multiple apparatus;

Fig. 6 is an elevation of the apparatus shown in Fig. 5 with one of the dough pans in section;

Fig. 7 is a sectional view of a modified type of former; and

Fig. 8 is a section taken approximately on the line 8—8 of Fig. 7 with a handle member included.

In Fig. 1 there is illustrated a series of dough pans 10 which are shown to be substantially frusto-conical in shape with flat bottoms. The pans 10 are interconnected at 11 so that they are retained in pre-determined spaced relation.

Figs. 1 and 2 illustrate a dough former A which includes a dough forming head 12 having three radial arms 13. The arms 13 have blunt bottom edges 14 to prevent the forming head 12 from cutting through the skin of the dough when the roll is being made. Extending upwardly from the forming head 12 is a central vertical shank 15 at the upper end of which is a handle 16.

Each of the radial arms 13 constituting the forming head 12 has a recess 17 formed inwardly from the end of each arm 13 and in each recess is an extension member 18 which is slidable in the recess. Each extension member 18 has a downwardly tapering outer face 19 and said outer face 19 is transversely curved as best shown in Fig. 2, and the arc of the curve is preferably similar to the curvature of the walls of the pans 10. A compression spring 20 interposed between the back wall of each recess 17 and the rear end of the extension member 18 normally urges the extension member outwardly from the end of each radial arm 13. A pin 21 which is secured to each radial arm 13 and extends into each recess 17 is received in a slot 22 formed in the extension member 18. The pin 21 which is best shown in Fig. 2 limits the reciprocal movement of each extension member 18. It should also be noted in Fig. 1 that the bottom portion of each of the extension members 18 is blunt and is shaped generally the same as the bottom portion 14 of each radial arm 13.

In Figs. 7 and 8 there is illustrated a different type of dough forming tool. It includes three interconnected radial arms 23 having a vertical shank 24 arising from their point of connection, said shank 24 having a handle 25. Each of the radial arms 23 has an upper cut-away portion 26 and a lower cut away portion 27. A cap-like extension member 28 is slidably fitted over the cut away outer end portions of the arms 23, and each extension member 28 is normally urged outwardly by a compression spring 29, seated in a socket 30 and extending outwardly to engage the inner wall of said cup-like extension member 28. A pin 31 secured to the extension member 28 rides in a slot 32 formed in the upper face of each arm 23 to limit reciprocal movement of the extension member. The outer end of each cap-like extension members 28 is tapered downwardly, as best illustrated in Fig. 8, and is shaped transversely arcuate, as best shown in Fig. 7. It should also be noted in Fig. 7 that the ends of the cap-like extension member 28 are flared as at 33 for a purpose to be described. The bottom edges of the radial arms 23 and of the cap-like extension members 28 are blunt in the same manner as the arms 13 and extension members 18 shown in Fig. 1.

Figs. 5 and 6 illustrate a multiple type of apparatus and a simplified form of dough forming head. In those views there is illustrated a plurality of pans 10 interconnected to form a block of spaced pans in aligned rows. In each pan is a dough forming head 34 which has the general configuration of the previously described heads. Its bottom portions are blunt and the outer end of each radial arm making up the head is tapered downwardly as in the other forms. However, in this form the dough forming head 34 has no movable extension member. Each of the heads 34 has a vertical shank 35 connected thereto, and the upper end of each shank 35 is journalled in a plate or tray 36, each shank having a lower shoulder 37 and an upper collar 38. Between the collar 38 and the plate 36 on each shank 35 is a pinion 39. A rack 40 meshes with each pinion in a line as indicated in Fig. 5, there being three such racks. The racks 40 are connected at their ends to cross arms 41 and 42. The cross arms 41 and 42 lie in guideways 42a which permit limited reciprocation of the cross arms, said guideways 42a being secured to the plate 36.

At the ends of the plate 36 upturned handle members 43 are provided to permit the entire assembly to be moved about and to provide means for pressing the dough forming heads 34 into the dough in the several pans 10. On the left-hand handle 43 a leaf spring 44 is secured and its ends bear against the cross arm 41 normally urging it to the right.

An angular lever 45 is pivotally supported by a small lug or ear 46 which extends downwardly from the bottom of the plate 36 and, as shown in Fig. 6, the upstanding leg of the lever 45 lies adjacent the cross arm 42. Thus when the assembly is held by the handles 43 it is possible to impart oscillatory motion to the dough forming heads 34 by intermittently pulling upwardly on the long leg of the lever 45 with one's finger and releasing said lever, the spring 44 returning the racks 40 to the right after the lever 45 has pushed the racks to the left.

It should be understood that the multiple assembly shown in Figs. 5 and 6 is intended to be used interchangeably with any of the dough forming heads shown in Figs. 1, 6 and 8.

Fig. 3 illustrates a completely formed "cloverleaf" roll. It is made up of three segments 47.

In forming such a roll a ball of dough B is placed in each of the pans 10 (see Fig. 1) and a dough forming head is then pressed into the ball, as shown in Fig. 2, to separate the ball into a plurality of parts. The blunt lower edges of the dough forming heads do not cut through the dough ball, but carry the skin of the dough downwardly to the bottom of the pan. It is, of course, understood that when a ball of dough is formed its outer surface becomes slightly drier and less tacky than the untouched inner mass of dough. Because of the different characteristics of the outer surface of the dough ball, it is generally spoken of as having a skin.

After the forming head has been pressed through the dough ball it is then given an oscillatory motion which completely separates the several sections of the dough ball at the bottom of the pan and also causes the dough to assume the general shape shown in Fig. 3. Then the forming head is pulled upwardly and at first the sections are completely separated as indicated in Fig. 4. Soon, however, the dough raises and expands until the sections contact each other to provide the roll structure shown in Fig. 4. Then, as is well known, after the dough is baked and the roll is removed from the pan its parts will remain together, but when the roll is broken it will separate along the lines 48 because of the fact that the skin of each section is carried down between the sections.

When separating the initially formed dough ball into its several parts it is desirable to use a dough forming head having movable extension members such as the members 18 and 28 shown in Figs. 1 and 8. When a forming head having extension members is first inserted in the pan said movable extension members will be pressed outwardly to their fullest extent and in such position will just fit into the wider top portion of the pan. As the forming head is pressed downwardly through the dough ball the extension members will contact the sides of the pans and be gradually pressed inwardly. This insures separation of the dough ball adjacent the side walls of the pan.

In Fig. 1 one of the extension members 18 is shown with its lower outer end portion contacting the side wall of the pan 10, and the remainder of the end face of the member 18 slants gradually away from the wall of the pan. This is done to insure contact at the bottom of the extension member for proper separation of the dough at the wall of the pan.

The one piece forming head shown in Figs. 5 and 6 is, of course, easier to manufacture and desirable for that reason. However, it has been found that the baking pans vary somewhat in size and shape, and the one piece head does not properly fit the pan when it is pressed through the dough ball. Cast pans could be used, but there is considerable added expense involved in their manufacture and for that reason I prefer a former having movable extension members which will properly fit the pan regardless of variation.

Attention is called to the cap-like extension members 28 as they are illustrated in Fig. 7. The flared outer end portions 43 separate the dough ball adjacent the pan sides and initially round the ball sections or segments at their more pointed portions, and when the forming head is oscillated the flared portions 33 of the extension members 28 additionally assist in forming the roll segments as desired.

From the foregoing description it will be seen that I have provided apparatus for forming bakery products which are adapted to be separated along pre-determined lines of division wherein most of the time consuming hand labor is eliminated. Not only is time saved, but the formation of a single dough ball requires less actual contact with the hands than the hand formation of several smaller dough balls. The apparatus effectively carries the upper skin downwardly along the lines of separation to produce the desired effect, and the oscillation or twisting of the forming head either by hand or with the multiple apparatus described quickly and efficiently settles the dough into the proper shape. The pans are formed in a frusto-conical shape to permit easy removal of the rolls and the forming heads are so shaped that they will nicely fit the interiors of the pans as the dough ball is being separated. The multiple head apparatus permits the formation of a number of rolls at one time and consequently reduces the time and cost of production.

It will, of course, be understood that various changes may be made in the form, details, arrangement and proportions of the various parts without departing from the scope of my invention.

What is claimed is:

1. Apparatus for forming rolls having radial lines of separation which includes, a forming head having radial arms with blunt bottom edges, and each of said arms having an extension member carried thereby and movable longitudinally thereof.

2. Apparatus for forming rolls having radial lines of separation which includes, a forming head having radial arms with blunt bottom edges, each of said arms having an extension member carried thereby and movable longitudinally thereof, and means yieldably urging said extension members radially outwardly.

3. Apparatus for forming rolls having radial lines of separation, and adapted for use with a frusto-conical pan, which includes, a forming head having radial arms with blunt bottom edges, each of said arms having an extension member carried thereby and movable longitudinally thereof, and the outer ends of said extension members being tapered downwardly.

4. The structure in claim 3 and said outer ends of said extension members being transversely arcuate on arcs substantially coinciding with the inner circumferences of said pan.

5. Apparatus for forming rolls having radial lines of separation which includes, a forming head having radial arms with blunt bottom edges, each of said arms having a cut-out portion extending inwardly from the outer end thereof, an extension member slidably positioned in each cut-out, means for limiting the outward movement of each extension member, and means yieldably urging said extension members outwardly.

6. Apparatus for forming rolls having radial lines of separation which includes, a forming head having radial arms with blunt bottom edges, extension caps slidably fitted over said arms and movable longitudinally thereof, means for limiting the movement of said extension caps, and means for urging said caps yieldably outwardly on said arms.

7. Apparatus for forming rolls having radial lines of separation which includes, a forming head having radial arms with blunt bottom edges, and said arms being flared at their outer ends.

8. Apparatus for forming rolls having radial lines of separation which includes, a forming head having radial arms with blunt bottom edges, and each of said arms having outer portions movable inwardly and outwardly relative to said arms.

NORMAN R. ERICKSON.